United States Patent [19]

Lerner et al.

[11] Patent Number: 5,411,627

[45] Date of Patent: May 2, 1995

[54] METHOD AND APPARATUS FOR MANUFACTURE OF TUBING

[75] Inventors: Bernard Lerner, Aurora; Dana Liebhart, Cuyahoga Falls; John VanDomelen, Gates Mills, all of Ohio

[73] Assignee: Automated Packaging Systems, Inc., Streetsboro, Ohio

[21] Appl. No.: 227,579

[22] Filed: Apr. 14, 1994

Related U.S. Application Data

[63] Continuation of Ser. No. 4,629, Jan. 14, 1993, abandoned, which is a continuation of Ser. No. 846,973, Mar. 6, 1992, abandoned, which is a continuation of Ser. No. 309,333, Feb. 10, 1989, abandoned.

[51] Int. Cl.⁶ ............... B29C 53/36; B29C 65/10; B31B 23/60; B31B 27/60
[52] U.S. Cl. .................... 156/466; 156/82; 156/203; 156/251; 156/497; 156/515
[58] Field of Search ............... 156/82, 203, 251, 466, 156/497, 515

[56] References Cited

U.S. PATENT DOCUMENTS

| | | | |
|---|---|---|---|
| 2,157,732 | 5/1939 | Piazze | 156/497 |
| 2,224,017 | 12/1940 | Gurwick | 493/188 |
| 2,459,234 | 1/1949 | McDowall . | |
| 2,474,917 | 7/1949 | Schenk . | |
| 2,488,212 | 7/1949 | Lloyd . | |
| 2,660,219 | 11/1953 | Haas et al. . | |
| 2,678,679 | 5/1954 | Bergstein . | |
| 3,033,257 | 5/1962 | Weber | 156/251 |
| 3,066,064 | 11/1962 | Pommer . | |
| 3,640,794 | 2/1972 | Rochla | 156/583.5 |
| 3,736,219 | 5/1973 | McTaggart . | |
| 3,788,917 | 1/1974 | Linda | 156/82 |
| 3,850,716 | 11/1974 | Podvin . | |
| 3,950,205 | 4/1976 | Hawkins et al. | 156/251 |
| 3,951,050 | 4/1976 | Poole | 156/497 |
| 3,957,618 | 5/1976 | Spirig . | |
| 4,113,601 | 9/1978 | Spirig . | |
| 4,206,029 | 6/1980 | Spirig . | |
| 4,243,449 | 1/1981 | Swartz . | |
| 4,308,087 | 12/1981 | Johnson | 156/497 |
| 4,336,122 | 6/1982 | Spirig . | |
| 4,339,324 | 7/1982 | Haas . | |
| 4,424,105 | 1/1984 | Hanson . | |
| 4,425,215 | 1/1984 | Henes . | |
| 4,609,367 | 9/1986 | Savich et al. | 156/515 |

FOREIGN PATENT DOCUMENTS

| | | | |
|---|---|---|---|
| 0230107 | 5/1959 | Australia | 156/497 |
| 61352 | 9/1982 | European Pat. Off. . | |
| 1297200 | 5/1961 | France . | |
| 1463973 | 11/1965 | France . | |
| 2099427 | 3/1972 | France . | |
| 2377263 | 8/1978 | France . | |
| 0076800 | 10/1970 | Germany | 156/251 |
| 1058663 | 2/1967 | United Kingdom | 156/251 |
| 2084921 | 4/1982 | United Kingdom . | |
| 2219966 | 12/1989 | United Kingdom . | |

OTHER PUBLICATIONS

"Chemical Engineering Thermodynamics", Balzhiser, et al., Prentice-Hall, 1972, pp. 499-505.

Primary Examiner—Michael W. Ball
Assistant Examiner—Francis J. Lorin
Attorney, Agent, or Firm—Watts, Hoffmann, Fisher & Heinke

[57] ABSTRACT

A heating system for joining plastic films which is capable of matching the potential of the laser. The system comprises a burner assembly and a workholder. The burner assembly includes a torch tip with an inner diameter of 0.016 inch which is capable of delivering a hot, concentrated flame onto a narrowly exposed film workpiece at a 15°. The workholder includes a heat-conductive base roll and a plurality of hold-down rolls which expose an edge portion of approximately 0.0625 inch so as to prevent the plastic film from shriveling away from the joint. These features in combination permit the advantages both of high speed manufacture and of a high-quality bead seal.

40 Claims, 5 Drawing Sheets

METHOD AND APPARATUS FOR MANUFACTURE OF TUBING

This is a continuation of application Ser. No. 08/004,629, filed on Jan. 14, 1993, abandoned, which is a continuation of application Ser. No. 07/846,973, filed on Mar. 6, 1992, abandoned, which is a continuation of application Ser. No. 07/309,333, abandoned, filed on Feb. 10, 1989, now abandoned.

TECHNICAL FIELD

This invention relates to the manufacture of plastic products and more particularly to a method and apparatus for the high speed manufacture of plastic tubing.

BACKGROUND ART

Many products are sold in plastic bottles. Plastic bottles have cost and other advantages over their glass and metal counterparts. One disadvantage is it is relatively difficult to apply labels to them.

The use of pre-printed and pre-formed plastic sleeves as labels is gaining increasing acceptance as a preferred, if not the preferred, method of labeling such plastic bottles. A method and machine for labeling bottles with plastic label sleeves is described more fully in U.S. Pat. No. 4,620,888 issued Nov. 4, 1986 to William M. Easter et al. entitled "Labeling Apparatus". The disclosure of that patent is incorporated by reference.

Sleeve-type labels are typically made with polyethylene film. The film is first printed to provide the decoration and information desired. The film is then folded and a longitudinal seal is formed to convert the folded film into a tube. Transverse perforations are then formed to delineate the ends of the sleeves and the perforated tube is then coiled and shipped to a location where bottles are to be labeled.

One technique which has been used for forming bead seals in superimposed film layers in the manufacture of tubing utilizes so-called "hot knives". A hot knife is a metallic element which is heated to both sever and seal superposed film layers. While hot knives have long been used, they are not fully satisfactory for the manufacturing of sleeves because they are the limiting factor as to the speed with which sleeves can be manufactured.

As an expedient to improve the rate at which sleeves are manufactured, lap seals have been formed. With this technique, edge portions of superposed layers of film were heated with hot air to form a seal. When the sleeve was put over a bottle this seal formed a projection known as a "flag" which was objectionable from an appearance standpoint.

So called "flame sealing" of plastic film has been known for a number of years. For example, one technique used to make sample sleeves and bags is to place two layers of film between superposed precision plates with small edge portions of the film projecting from the plates. The projecting film is then heated with a propane torch to form a bead seal. This procedure has not been satisfactory for production techniques because it is slow.

There have been proposals for providing an in-line series of flame jets. Such proposals typically would utilize a tube as a manifold. The tube would have an axially aligned series of spaced holes drilled in it through which natural gas or propane was to be projected to provide an in-line set of flames. While there have been such proposals, so far as we are aware, they have not proved successful at least to provide quality seals at the high production rates desired for sleeve manufacture.

DISCLOSURE OF THE INVENTION

These described and other short comings of the prior art are overcome by the present invention. According to this invention, an aligned series of high temperature and highly focused flame jets are provided. The film is fed and tensioned over a drum. A series of rollers are biased against the film. The jets of the set are each paired with a different one of the rollers. Thus, the number of rollers and the number of jets is equal.

The appropriate number of jets is linearly related to the speed at which the film is fed. For 2 mil. polyethylene being fed at 600 feet a minute, one provides from 11 to 14 jets. If film were to be fed at 1200 feet a minute, one would provide from 22 to 28 jets. Thus, in this example, one provides one burner per 43 to 55 feet per minute of film speed where the film being fed is 2 mil polyethylene.

Because of the high speed which can be achieved, with the sealing system of this invention, it is no longer a limiting factor on the manufacturer of sleeves. Indeed, the sealing system of this invention is preferably operated in line with a multi-color printing press. In one continuous operation, film can be printed at speeds approaching 600 feet per minute (believed to be the fastest speed currently available with a six color press) folded with a V or U fold, heat sealed and coiled, all at 600 foot per minute speeds. By contrast, maximum speed achievable with hot knives is of the order of 120 feet per minute, and with the hot air "flag" system, of the order of 300 feet per minute.

In the disclosed and preferred embodiment of the invention, a heating system for fusing two plastic films includes a burner assembly for directing a series of flames onto the films and a support or workholder for holding the plastic under the flame. The support is in the form of the described drum and roller set. Each flame is provided by a hollow torch tip having an inner diameter preferably no greater than about 0.016 inch and a torch body for supporting the tip.

The central axis of each torch tip is disposed in a plane located by the drum axis and the axis of its associated roll. The torch axis is directed at an angle of substantially from 15° to 20° with respect to the radius of the associated roll. When in use, the plastic projects slightly (about 1/16 inch) from the edge of the drum and the central axis of the torch tip intersects the plastic. Thus about one half of the flame impinges on the plastic while the other half is in the air. These elements cooperate to provide a system which produces an unexpectedly high quality bead seal.

The torch body comprises a conduit for receiving a gaseous fuel, a pipe connected to the conduit for receiving the fuel from the conduit, and a nozzle for reducing the cross-section of the fuel flow and feeding the fuel to the torch tip. This structure permits the burner assembly to be used with a remote fuel supply.

For set up purposes, each burner tip is mounted for adjustment both radially and axially of the drum. To this end a base member is fixed to a burner frame. A pair of orthogonally adjustable support members are mounted, one on the base member and the other on the one member. The other carries the burner tip. Adjustment screws are provided to move the support members relative one another and relative to the base member.

A preferred gas generator is one which generates a substantially stoichiometric mixture of hydrogen and oxygen, i.e. a mixture of eight parts oxygen to one part hydrogen by weight. One type of generator for producing a stoichiometric mixture includes means for decomposing water into its constituent elements.

The drum and hold-down rolls function as a support which is a heat sink. To this end the base roll or drum is an aluminum roll with a wear surface coating preferably of nickel. The drum includes a stainless steel ring as a wear surface against which the hold-down rolls function. The hold-down rolls are preferably copper or copper alloy. The heat sink characteristic of the support is to assure that the heat effect of the impinging flames is confined to the formation of a bead and that the body of the sleeve itself is not deleteriously effected by the heat.

In summary, a preferred system for fusing two plastic films comprises a burner assembly and a support. The burner assembly includes a fuel gas generator, a conduit for receiving the gas, and a set of torch subassemblies. Each torch subassembly includes a torch including a torch holder, a torch body and a torch tip. The support includes a heat-conducting drum or base roll and a plurality of hold-down rolls. For 2 mil polyethylene being fed at 600 feet per minute, the preferred number of burner assemblies is fourteen.

The preferred use of the present fusing system is as part of a larger system for manufacturing bottle sleeves. The larger system includes, in addition, a plastic film supply, a printer for printing the strip of film delivered from the supply, a folder for folding the printed strip longitudinally into "U" or "V" folds to approximately align workpiece portions to be fused in overlaying relationship, and a separator for forming latitudinal lines of weakness in the workpiece after it has been formed into a tube to delineate the sleeve ends.

Accordingly, one object of the present invention is to provide a novel and improved method for producing plastic products which include high-quality bead seals.

Additional features and advantages of the invention will become apparent and a fuller understanding obtained by reading the following detailed description in connection with the accompanying drawings.

BRIEF DESCRIPTION OF THE DRAWINGS

FIG. 6b is a partially cutaway view of a preferred base roll for the present invention, taken along line B—B in FIG. 6a;

BEST MODE FOR CARRYING OUT THE INVENTION

As of Apr. 14, 1994, the date of filing a second file wrapper continuation, the commercial practice of a license under this patent had been modified in the manner taught and claimed in application Ser. No. 08/124,334 entitled "Method and Apparatus for Converting Plastic" filed Sep. 20, 1993 by John D. Jensen. The Jensen application is hereby incorporated by reference for the purpose of satisfying the best mode requirement as of Apr. 14, 1994.

Figure 1:
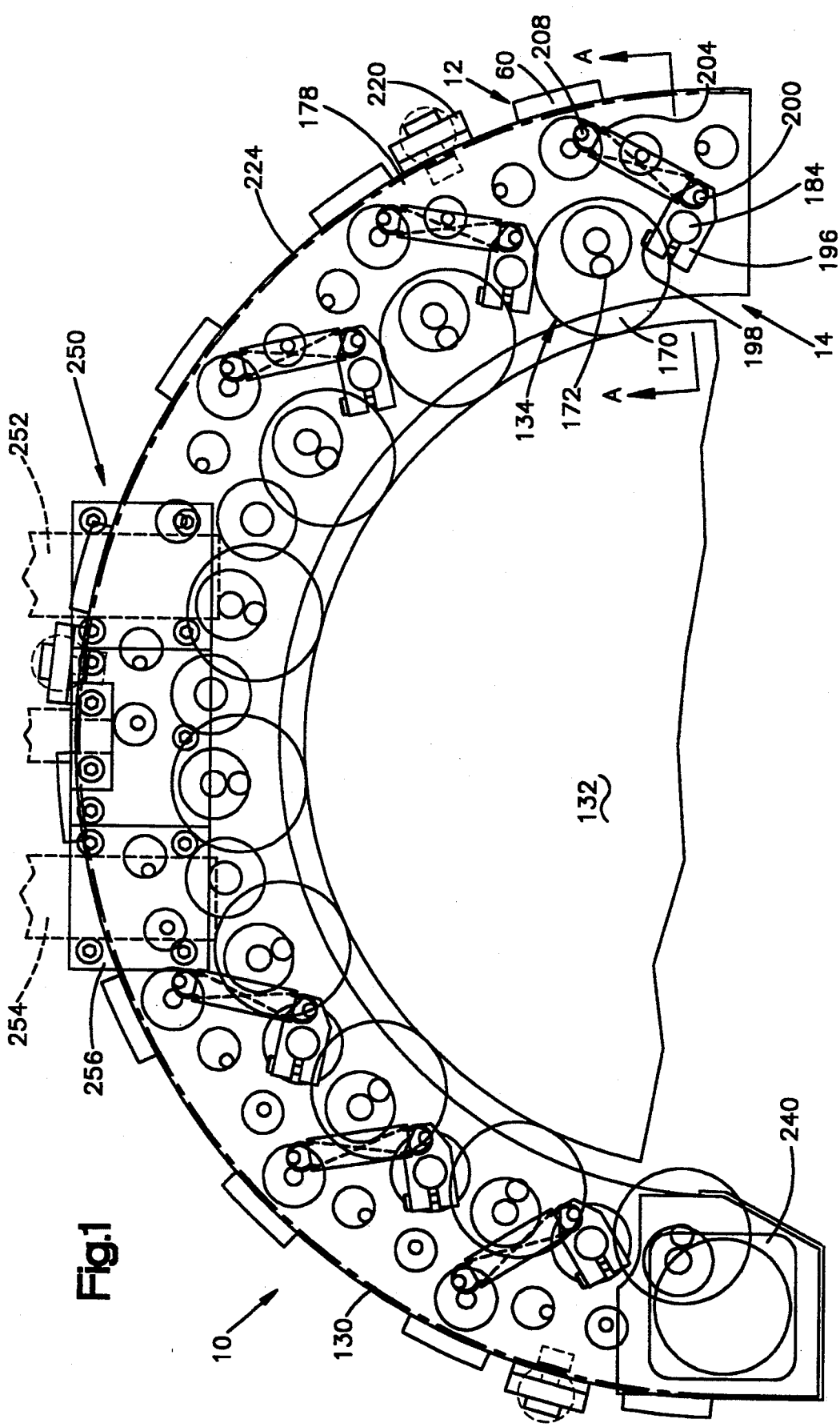
FIG. 1 is a partial rear elevation view of the sealer head assembly showing the positions of the base roll, hold-down roll assemblies, burner assemblies and take-up roll for a preferred embodiment of the heating system having nine burners.

Referring now to FIG. 1, a heating apparatus according to the present invention is shown generally at 10. The heating apparatus 10 includes a plurality of burner assemblies, one of which is shown schematically at 12, and a support or workholder, shown generally at 14.

Figure 4:
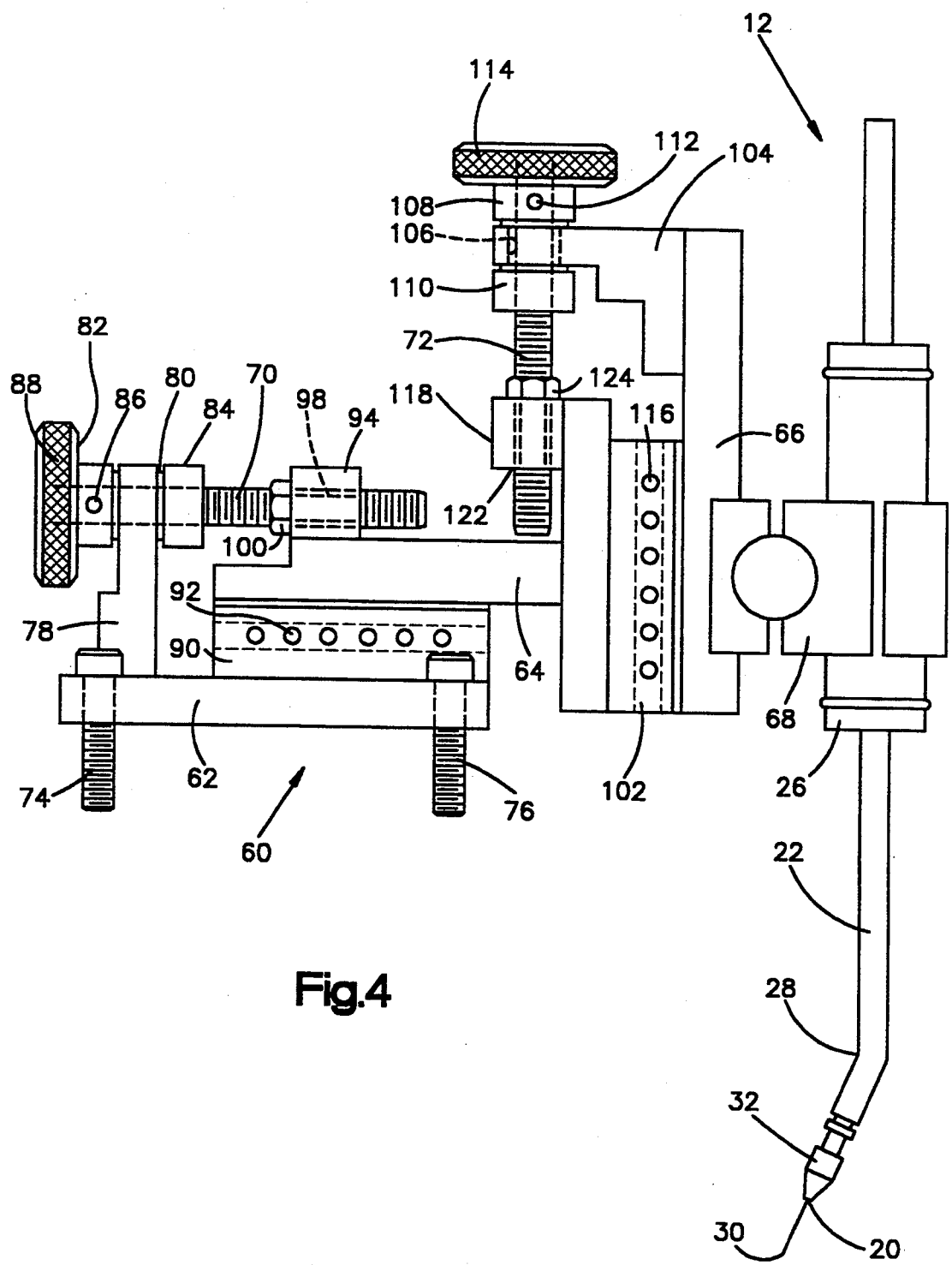
FIG. 4 is an elevation view of a torch body and burner assembly support of the present invention.
Figure 5:
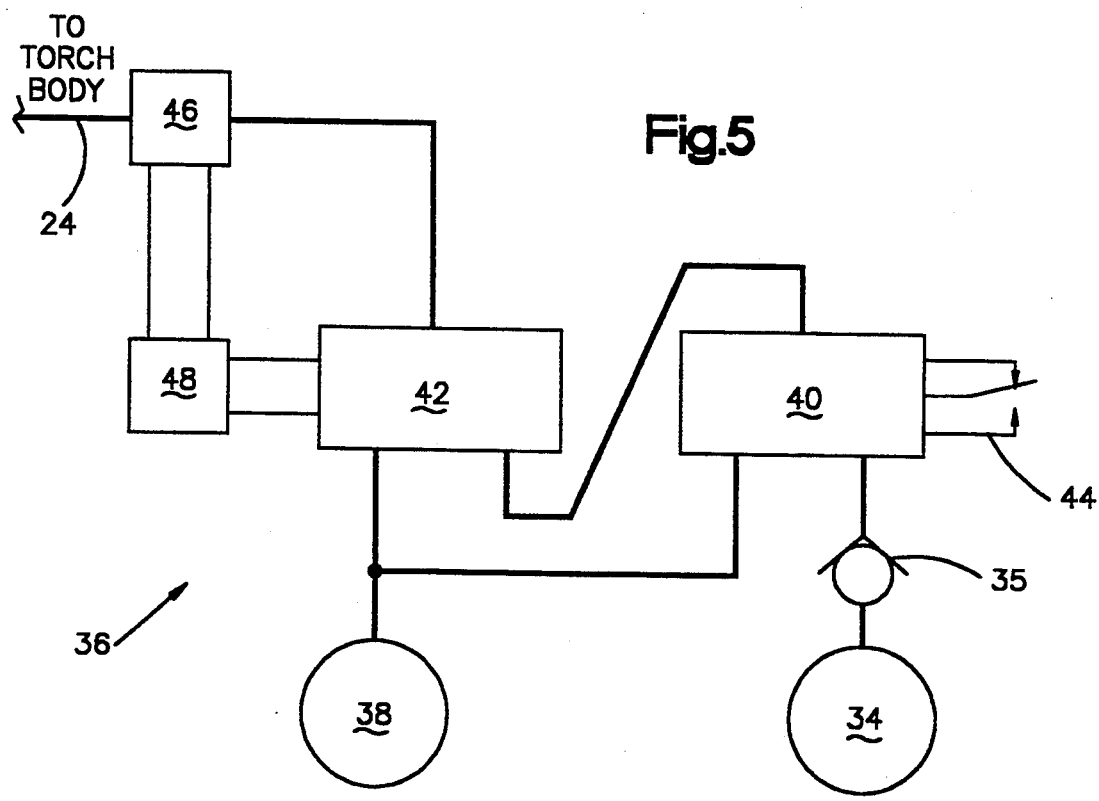
FIG. 5 is a schematic of one of the burner assemblies.

Turning to FIG. 4 and 5, a preferred burner assembly 12 includes a torch tip 20 and a torch body comprising a pipe 22 and a conduit 24. The pipe 22 is partially enclosed in a sleeve 26 and is bent as at 28 so that the torch tip 20 may be directed at an angle toward the workpiece.

The torch tip 20 is a hollow tube with an inner diameter of approximately 0.016 inch. It must be formed of a material capable of withstanding the temperatures generated by the flame near its outlet end 30 without significant change in inner diameter.

Above the torch tip 20 is a pipe 22 which is in fluid communication with the tip. The pipe 22, which has a substantially larger cross-section than the tip, serves as a convenient "handle" to permit a burner support to engage the burner. A sleeve 26 surrounds the pipe 22 in order to further facilitate engagement of the burner by the support.

In order to reduce friction losses in the fuel, a nozzle 32 is positioned between the relatively wide pipe 22 and the relatively narrow tip 20 so as to narrow the flow cross-section gradually rather than sharply.

The conduit 24 is preferably composed of flexible tubing. The tubing may be connected with the pipe 22 by stretching the tubing over the end of the pipe 22. The joint may then be sealed by clamping or tying the wall of the tubing against the end of the pipe.

A preferred fuel supply for the burner assembly 12 includes a gas generator 34, a flashback arrester 35 and a purging valve 36. A preferred gas generator 34 is one which generates a stoichiometric mixture of hydrogen and oxygen, i.e. a mixture of eight parts oxygen to one part hydrogen by weight, through the decomposition of water into its elements. One such generator is disclosed in one or more of U.S. Pat. No. 4,425,215 to Henes; U.S. Pat. No. 4,424,105 to Hanson; and U.S. Pat. No. 4,339,324 to Haas.

A purging system including the purging valve 36 is more fully disclosed in U.S. patent application No. 07/283,262, filed Dec. 9, 1988, now abandoned the disclosure of which is incorporated by reference. Simply put, the purging system includes a compressed air supply 38 and two three-way solenoid valves 40, 42. The two solenoids act collectively as a logical "NAND" gate, supplying fuel only when a remote switch 44 is not activated and a pressure transducer 46 does not indicate that the pressure has fallen below a threshold value. If an operator closes remote switch 44 or a pressure drop in the conduit 24 triggers the pressure transducer 46 to signal the switch 48, compressed air from the supply 38 purges the burner assembly 12.

While the purging system should prevent flashback, i.e. propagation of the flame back into the gas generator 34, a flashback arrestor 35 may be provided as an added precaution. In one embodiment, the flashback arrestor 35 is a check valve which prevents backflow from the solenoid 40 into the generator 34.

Turning to FIG. 4, the preferred embodiment of the present invention also includes a burner assembly support 60 for supporting and positioning the burner assembly 12 over the workpiece. The burner assembly support 60 includes a base 62, a first member 64, a second member 66, a yoke 68 and first and second threaded connectors 70, 72 for positioning the first and second members 64, 66 vertically and horizontally.

The base 62 is fixed to a head assembly 130 (FIG. 1) by means of two bolts 74, 76. The base 62, in turn, rigidly mounts a stanchion 78. A smooth bore 80 passes through the stanchion 78 for receiving the first threaded connector 70. The first threaded connector 70 is held on the stanchion 78 by means of a knob 82 and a collar 84. In a preferred embodiment, the knob 82 is held on the threaded connector 70 by means of a set screw 86 and has an annular surface 88 which is knurled to permit an operator to turn the connector 70.

The first member 64 is seated horizontally on a seat 90 mounted on and forming a part of the base 62. A plurality of rollers 92 are positioned between the first member 64 and the seat 90 to allow the member to slide easily over the seat. A block 94 is bolted onto the first member 64. The block 94 has a threaded throughbore 98 for engagement with the first threaded connector 70. A nut 100 is positioned on the threaded connector 70 between the collar 84 and the block 94.

By grasping the knurled surface 88 of the knob 82 and rotating the first threaded connector 70, an operator may adjust the horizontal position of the burner assembly 12. Once the burner assembly 12 is positioned horizontally, the nut 100 may be positioned snugly against the block 94 in order to secure the first member 64 against horizontal movement.

The first member 64 mounts a seat 102 which is bolted to and forms a part of the first member 64. The second member 66 sits vertically against the seat 102. A plurality of rollers 116 are positioned between the seat 102 and the second member 66 to allow the member to slide easily over the seat.

A stanchion 104 is bolted onto the second member 66. A smooth bore 106 passes through the stanchion 104 for receiving the second threaded connector 72. The second threaded connector 72 is held on the stanchion 104 by means of a knob 108 and a collar 110. In a preferred embodiment, the knob 108 is held on the threaded connector 72 by means of a set screw 112 and has an annular surface 114 which is knurled to permit an operator to turn the connector 72.

The first member 64 also mounts a block 118 which has a threaded throughbore 122 for engagement with the second threaded connector 72. A nut 124 is positioned on the threaded connector 70 between the collar 110 and the block 118.

By grasping the knurled surface 114 of the knob 108 and rotating the second threaded connector 72, an operator may adjust the vertical position of the burner assembly 12. Once the burner assembly 12 is positioned vertically, the nut 124 may be positioned snugly against the block 118 in order to secure the second member 66 against vertical movement.

The yoke 68 is bolted to the second member 66 and grasps the sleeve 26.

Returning to FIG. 1, in a preferred embodiment of the invention, the support comprises a head assembly 130 and a base roll or drum 132 which acts as a support for defining the path of travel of the workpiece. A plurality of hold-down roll assemblies, one of which is shown at 134, are rotatably mounted on the head assembly 130. A workpiece consisting of a strip of plastic film, folded longitudinally so as to approximately align the two longitudinal ends of the strip, is held in the nip between hold-down rolls 170 and the base roll 132 as it passes under the burner assemblies 12.

Figure 6A:
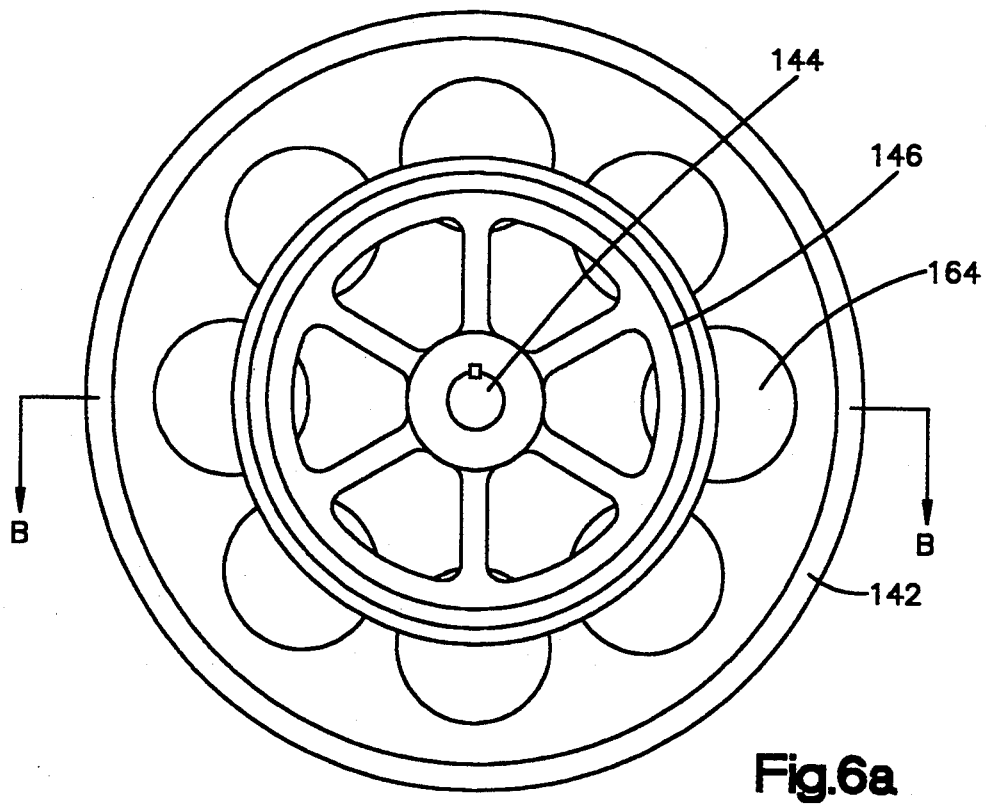
FIG. 6a is an axial elevation view of a preferred base roll for the present invention, with one of the drums shown in section.
Figure 6B:
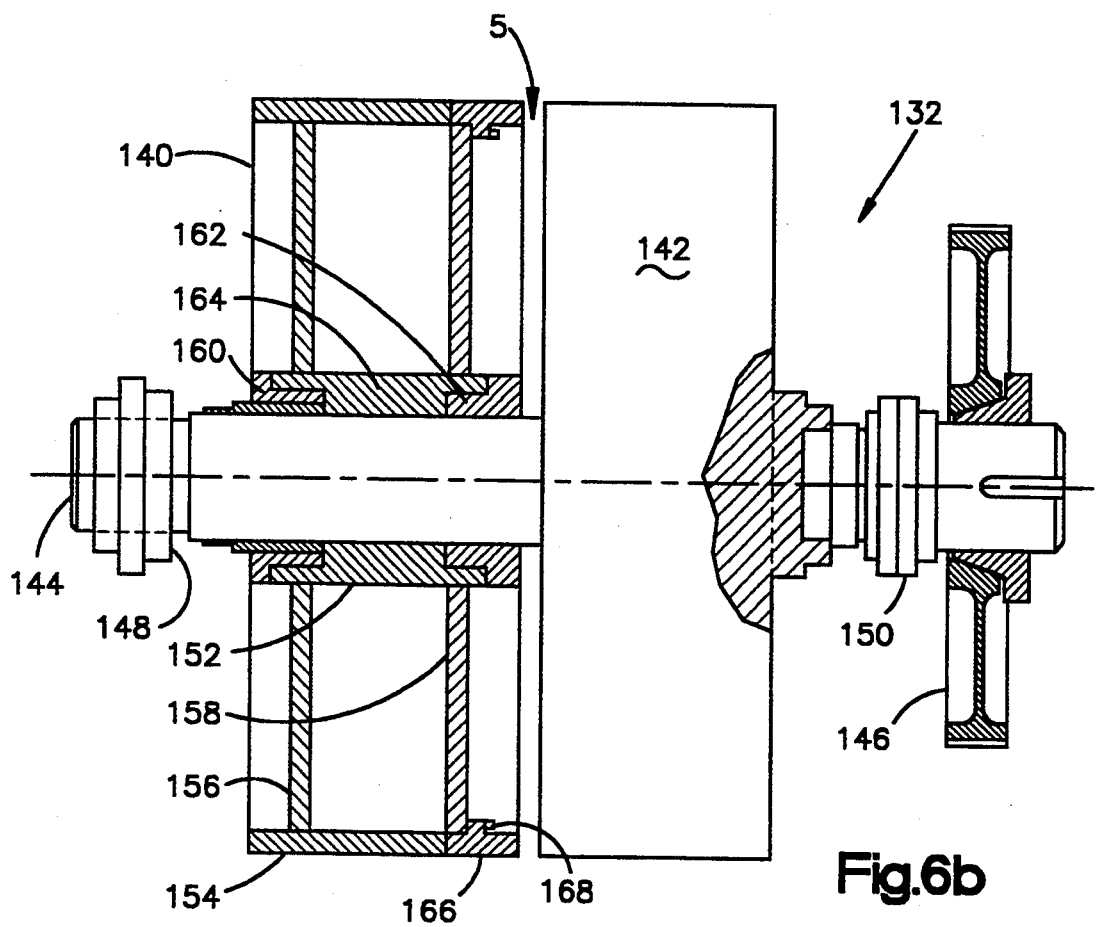

As best shown in FIGS. 6a and 6b, the preferred base roll 132 consists of a pair of drums 140, 142 secured to a shaft 144 which, in turn, is keyed to a pulley 146. The drums are preferably aluminum with nickel plating. The shaft 144 is journalled at either end of the drums, as shown at 148, 150, to permit rotation relative to the system frame. In operation, the base roll 132 is turned by a motor (not shown) which is connected to the pulley 146 through a belt (not shown).

The drum 140, which is shown in section, consists of a central sleeve 152, an outer cylinder 154, and a pair of circular webs 156, 158. The central sleeve 152, in turn, includes a pair of end caps 160, 162 and a connecting member 164 which connects the end caps 160, 162. As best shown in FIG. 6a, the webs 156, 158 includes a plurality of bores 164. These features of the drum 140 make it particularly suitable for conducting heat away from the workpiece and into the surrounding atmosphere.

In one embodiment, a stainless steel wear section 166 is bolted to the end of the drum 140. It is this wear section 166 which cooperates with the hold-down rolls 170 to form the nip which holds the workpiece during heating.

The drum 142 is of similar construction to drum 140. The two drums 140, 142 are separated by approximately an inch to create a gap in which the flame can act on the workpiece. When manufacturing a single tube, the folded film is in intimate contact with the outer cylinder 154 and wear surface 166 of one of the drums 140, 142. The web projects approximately 1/16 inch into the gap between the drums 140, 142 where the sealing takes place. When two tubes are sealed in parallel, the film lies over both drums 140, 142 with 1/16 inch portions of each film extending into the gap between the drums 140, 142. In a preferred embodiment, the workpiece is positioned in the nip between the base roll 132 and hold down rolls 170 so as to expose approximately 0.0625 inch of plastic film to the flame.

Returning again to FIG. 1 and 2, the head assembly 130 supports a plurality of hold-down roll assemblies 134 which cooperate with the base roll 132 to position the workpiece under the burner assemblies 12. Each burner assembly 12 has a corresponding hold-down roll assembly 134. In a preferred embodiment, the hold down rolls 134 consist of solid hold-down rolls 170 each supported on an associated shaft 172 by a pair of rolling bearings 174, 176. The hold-down rolls are made of copper to aid in the removal of heat from the workpiece.

The hold-down roll assemblies 134 are rotatably mounted on a head assembly frame 178 to allow the hold-down rolls to swing in and out of cooperation with the base roll 132. As shown in FIG. 1, some of the hold-down roll assemblies 134 are spring biased against the base roll 132 while others are gravity biased against the base roll 132 by their own weight.

Figure 2:
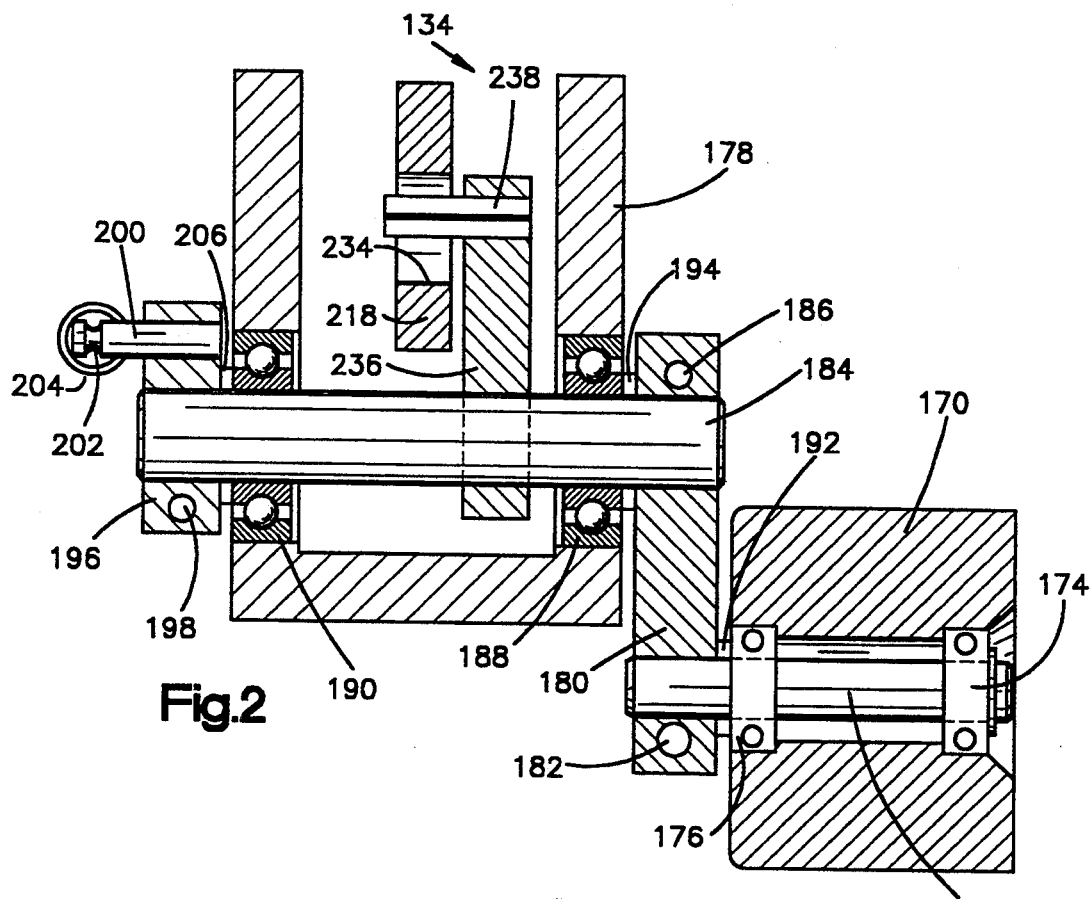
FIG. 2 is a cutaway view of a preferred spring-loading assembly for a hold-down roll, taken along line A—A in FIG. 1.

A pawl 180 positions the shaft 172 and hold-down roll 170 into cooperation with the base roll 132. As best shown in FIG. 2, a bolt 182 tightens one end of the pawl 180 around the shaft 172. The other end of the pawl 180 is tightened around a shaft 184 by means of a bolt 186. The shaft 184, in turn, is mounted on the head assembly frame 178 by a pair of rolling bearings 188, 190.

The hold-down roll 170 is separated from the pawl 180 by means of a spacer 192. Likewise, the pawl 180 is separated from the head assembly frame 178 by a spacer 194.

In the spring-loaded hold-down roll assemblies 134, a yoke 196 is tightened around the shaft 184 by means of a bolt 198. The yoke 196, in turn, is secured to a peg 200 having a fillet 202 for receiving the hooked end of a coiled spring 204. The yoke 196 is separated from the head assembly frame 178 by means of a spacer 206.

As best shown in FIGS. 1 and 2, the spring 204 is held at one end by the peg 200 and at the other by a peg 208 which is fixed to the head assembly frame 178. In operation, the spring 204 pulls against the peg 200. Peg 200 pulls on yoke 196, rotating shaft 184 and pawl 180. As spring 204 pulls peg 200 upward away from the base roll 132, pawl 180 pushes shaft 172 downward, pressing the hold-down roll 170 into cooperation with the base roll 132.

Figure 3:
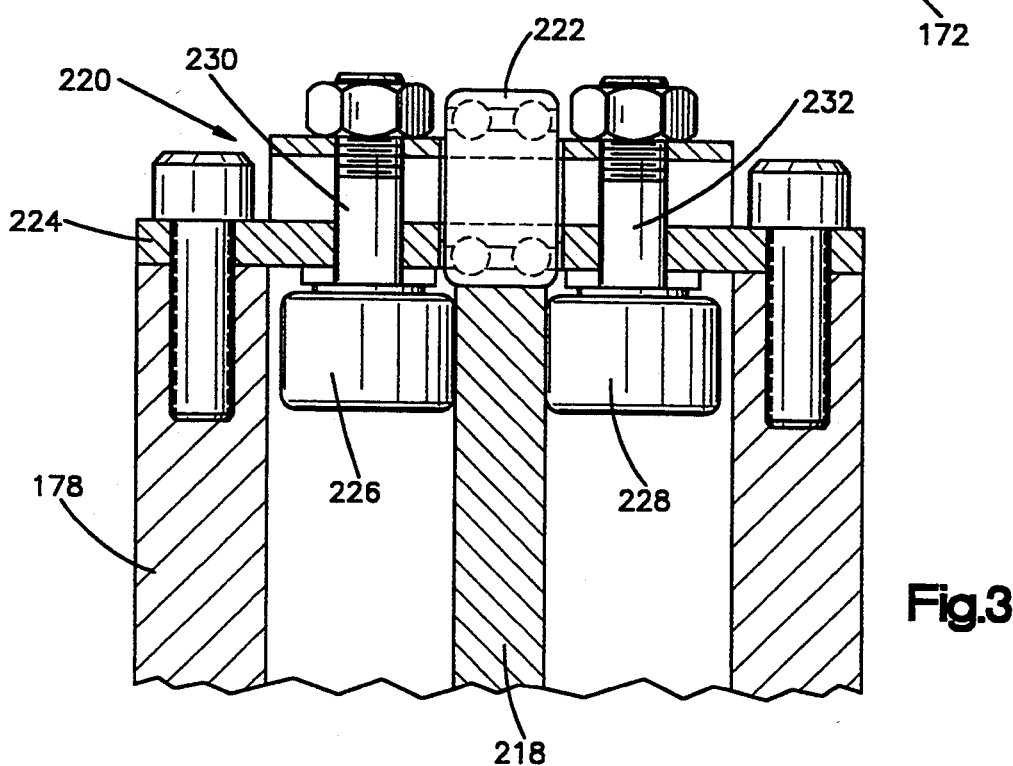
FIG. 3 is a detail of a mounting assembly which mounts the arc-shaped plate in the channel of the head assembly frame.

As best shown in FIG. 3, an arc-shaped plate 218 is mounted in the U-shaped channel of the head assembly frame 178 by a plurality of mounting assemblies, one of which is shown at 220. The arc-shaped plate 218 is positioned vertically at each mounting assembly 220 by a rolling bearing 222 positioned transversely to a plate 224 which is bolted onto the head assembly frame 178. Likewise, the arc-shaped plate 218 is positioned horizontally by a pair of cam rollers 226, 228 which are mounted on bolts 230, 232.

Returning to FIG. 2, the arc-shaped plate 218 contains a plurality of holes, one of which is shown at 234. Each of the hold-down roll assemblies 134, in turn, includes a yoke 236 tightened over the shaft 184 and mounting a peg 238. Each peg 238 is positioned in one of the holes 234.

As best shown in FIG. 1, a rotary actuator 240 is positioned at one end of the head assembly frame 178. When activated, the actuator 240 turns a cam wheel (not shown) which moves the arc-shaped plate 218 azimuthally within the head assembly frame 178. As the plate turns, the sides of the holes 234 engage the pegs 238, retracting the hold-down roll assemblies 134 from engagement with the base roll 132.

Referring again to FIGS. 1 and 4, each burner assembly support 60 is mounted on the head assembly frame 178 over an associated one of the hold-down roll assemblies 134. The bases 62 are mounted on a plate (not shown) which is bolted over the concave upper side of the head assembly frame 178. The pipe 22 is held radially over the base roll 132. Consequently, the nozzle 32 and torch tip 20, which are positioned on the pipe 22 below bend 28 (FIG. 4), are directed at an angle of substantially from 15° to 20° with respect to the radius of the base roll 132, which would be perpendicular to the surface of the workpiece adjacent the torch tip 20.

In operation, it is desirable to be able to adjust the burner assembly 12 vertically and horizontally so as to position the workpiece in the hottest part of the flame. This is done by turning the knobs 82, 108 on the burner assembly support 60 (FIG. 4) so as to move the torch tip 20 relative to the base roll 132. In the preferred embodiment, the hottest portion of the flame reaches approximately 6,000° F. The size and speed of the base roll 132 is determined by the dwell time which produces the best-quality joint.

The head assembly 130 also includes a main assembly 250 which includes a pair of hollow upright rods 252, 254 on which a journalled cross-member 256 coupled to the head assembly frame 178 may be lifted radially outward from the base roll 132.

A preferred application for the heating apparatus of the invention is as a sealer for plastic bottle labeling sleeves. As shown schematically in FIG. 7, an inline system for producing plastic sleeves 270 according to the present invention includes a supply of plastic film 272; a printing press 274 operatively connected to the supply for receiving the film and printing it; a folding mechanism 276 operatively connected to the press 274 for receiving the plastic web and folding it into a multiply workpiece; a flame seal mechanism 278 operatively connected to the folding mechanism 276 for receiving the workpiece and forming a bead seal to connect the workpiece into a tube; a tube weakening device 280 operatively connected to the seal mechanism for forming transverse lines of weakness end of interconnected commodities; and a take-up 282 operatively connected to the weakening means for receiving the interconnected commodities.

In practice, two flame seal head assemblies 130 may be positioned next to each other to form such workpiece into two tubes. The assemblies are identical for interchangeability but designed such that when oppositely oriented they will nest. That is, the burner assemblies 12 and supports 14 are staggered so that two adjacent systems may be oppositely oriented and nested circumferentially. With this arrangement, the burner assemblies are positioned to direct their respective flames into a space S between the rolls 140, 142, FIG. 6B, respectively adjacent the rolls to simultaneously produce two sealed webs from a single workpiece.

OPERATION

Figure 7:
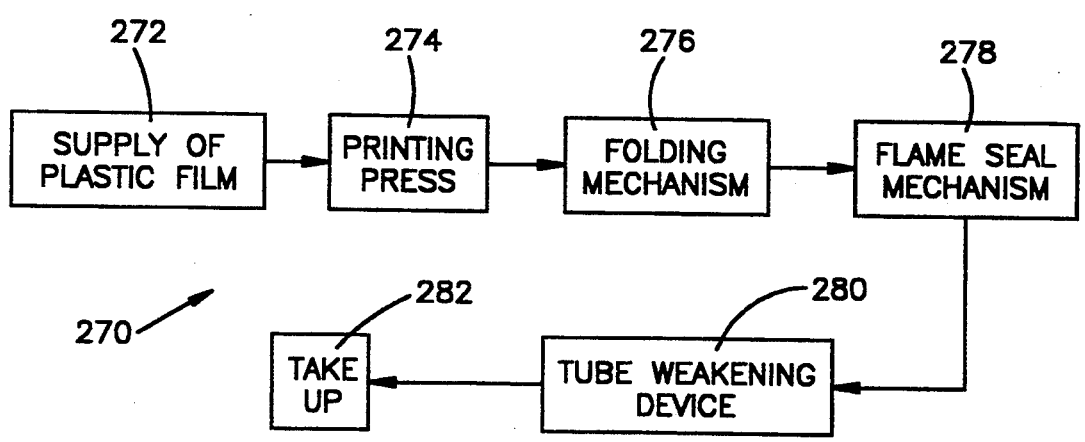
FIG. 7 is a schematic of a sleeve manufacturing machine incorporating the heating system of the present invention.

In operation a strip of polyethylene is formed by extruding the polyethylene into a tube in a conventional manner and thereafter slitting the tube and rolling the resultant film strip to form a coil. Referring to FIG. 7, this coil is the supply of plastic film 272 which is delivered to the printing press 274.

In set-up the lead edge of the coil is fed through the press 274 to folding station 276. At the folding station the web is fed through a folder which is either a "V" board if the machine is to be run single or a folder which produces a "U" fold if the machine is to be run double. As shown in FIG. 3, the camming plate 218 to lift all of the holddown rolls 170 out of engagement with the base roll or drum 142. If one is running double up the other set of rolls is cammed out of engagement with the other drum 140. The web is then fed through the line of weakness station 280 and thence to the take-up 282.

After the web has been fed through the sleeve forming system in the manner described and before printing is actually commenced, the holddown rolls are moved into engagement with the web and the machine is started up to cause plastic to feed through it. The sets of jets are ignited and adjusted toward and away from the web by manipulation of the knobs 82, 108, FIG. 4, until appropriate bead seals are being formed. The operator can readily determine whether the jet is positioned properly by moving the jet inwardly toward the workpiece until the plastic glows brightly where the bead is to be formed adjacent the appropriate one of the drums 140, 142.

At this juncture printing is commenced. Alternatively of course one may set up the printer and adjust it before adjusting the bead formation mechanism. In any event, the operator must then also check to make sure that lines of weakness are being appropriately registered with the printing so that they are indeed formed at the ends of the sleeves being manufactured and not at some intermediate location.

Once this has been done the system is set up for continuous operation and sleeves may be manufactured at rates at which the film is running up to 600 feet a minute. Assuming typical 5½ inch labels production rates of the order of a million sleeves per eight hour shift are routinely achievable.

While preferred embodiments of this invention have been described in detail, it will be apparent that certain modifications or alterations can be made therein without departing from the spirit or scope of the invention as set forth in the appended claims.

We claim:

1. In an apparatus for converting an elongate plastic web into a tube transported along a path of travel, an improved heat seal mechanism positioned along the path comprising
    a) a rotatable member positioned along the path and having a cylindrical surface for engaging portions of a web moving along the path;
    b) a torch positioned near the member, the torch having a nozzle for emitting a thin, hot flame along an axis intersecting the path transversely at an acute angle with respect to an imaginary line perpendicular to the path and at a location near but spaced from the member to impinge against the member and marginal portions of a web projecting outward from the member and the engaged portions, the flame axis intersection of the projecting portions being canted toward the member; and,
    c) the member when in use functioning both as a heat sink inhibiting heat softening of the engaged portions and as a shield to block flame impingement against the engaged portions.

2. The apparatus of claim 1 wherein the acute angle between the flame axis and the path is at least 15°.

3. The apparatus of claim 2 wherein the angle is from about 15° to 20°.

4. The apparatus of claim 1 wherein the flame axis is disposed in an imaginary plane which is radial of the member and parallel to its axis of rotation.

5. The apparatus of claim 1 further including a source of stoichiometric mixture of hydrogen and oxygen coupled to said torch as a fuel supply.

6. An inline system for producing interconnected plastic tubular commodities comprising:
    a) a supply of plastic film in the form of a multi-ply workpiece;
    b) two flame seal mechanisms operatively connected to the supply for conducting the workpiece along a path of travel and positioned to form such workpiece into two tubes, said flame seal mechanisms comprising two drums separated by a gap over which the plastic workpiece is fed in intimate contact along the path of travel and each of said flame seal mechanisms further comprising:
        a set of heat conductive holddown rollers cooperating with a section of one of said drums adjacent the gap to define an end portion of said workpiece; and
        a nozzle positioned to impinge a hot, thin flame against the end portion of the workpiece, the flame having an axis at an acute angle of at least 15° angled toward the drum of the same flame seal mechanism to form one of said tubes, the flame axis being disposed substantially in an imaginary plane that is radial of the drum; and,
    c) a take-up operatively connected to the seal mechanism for receiving the formed tubes.

7. An inline system for producing interconnected plastic tubular commodities comprising:
    a) a supply of plastic film in the form of a multi-ply workpiece;
    b) two flame seal mechanisms operatively connected to the supply for conducting the workpiece along a path of travel and positioned to form such workpiece into two tubes, said flame seal mechanisms comprising two drums separated by a gap over which the plastic workpiece is fed in intimate contact along the path of travel and each of said flame seal mechanisms further comprising:
        a set of heat conductive holddown rollers cooperating with a section of one of said drums adjacent the gap to define an end portion of said workpiece; and
        a nozzle positioned to impinge a hot, thin flame against the end portion of the workpiece, the flame having an axis at an acute angle of at least 15° angled toward the drum of the same flame seal mechanism to form one of said tubes, the flame axis being disposed substantially in an imaginary plane that is radial of the drum; and,
    c) a take-up operatively connected to the seal mechanism for receiving the formed tubes
    d) the holddown rollers of a set being circumferentially spaced about its drum and biased against a workpiece when in use to maintain the workpiece in engagement with the drum; and
    e) each of said nozzles being paired with a holddown roller and positioned to impinge a hot, thin flame against a portion of a workpiece projecting from the drum and holddown.

8. An inline system for producing interconnected plastic tubular commodities comprising:
    a) a supply of plastic film in the form of an elongate multi layer workpiece;
    b) a flame seal mechanism operatively connected to the supply for conducting the workpiece along a path of travel, melting projected edge portions of the workpiece and forming a seal to connect the workpiece layers, said flame seal mechanism comprising:
        i) a heat conductive circular drum journaled for rotation about its axis and for defining one side of a major portion of a path of travel for the multiply workpiece;
        ii) a set of circumferentially spaced heat conductive holddown rollers defining the other side of the major portion of the path and cooperating with the drum to form a workholder for causing transversely small portions of the workpiece to project from the workholder; and
        iii) a set of nozzles located at spaced locations near said path, each such nozzle being positioned to emit a hot, thin flame when in use which flame impinges on the projecting edge portions of the workpiece traveling along a minor portion of such path, the minor portion being adjacent the workholder and transversely aligned with the major portion; and, c) a take-up operatively connected to the seal mechanism for receiving the workpiece.

9. The system of claim 8 wherein the flame seal mechanism further comprises a burner assembly for directing a flame onto such workpiece, said burner assembly including:

i) a fuel gas generator for generating a fuel gas mixture consisting essentially of a stoichiometric mixture of hydrogen and oxygen, and iii) a plurality of torches supporting the nozzles for receiving the fuel gas mixture and conducting the mixture to the nozzles for combustion adjacent the longitudinal portions of the workpiece.

10. The system of claim 8 including means for lifting the holddown mechanism out of engagement with the workpiece when the system is not in use.

11. The system of claim 8 wherein each nozzle has an opening on greater than 0.016 inch in diameter adjacent the workpiece for defining the width of the flame.

12. The system of claim 8 wherein each nozzle is at an angle from about 15° to about 20° with the path of travel.

13. The system of claim 8 wherein the holddown mechanism further comprises:

a) means biasing the holddown rollers against a workpiece when in use to maintain the workpiece in engagement with the drum; and b) each of said nozzles being paired with a holddown roller and positioned to impinge a hot, thin flame against a portion of a workpiece projecting from the drum and hold down.

14. The system of claim 8 including a heating sub-system for supplying said nozzles comprising:

a) a head assembly including a head assembly frame;

b) a plurality of burner assemblies, each including:

ii) a gas generator for generating a stoichiometric mixture of hydrogen and oxygen;

ii) a conduit for conducting the stoichiometric mixture away from the gas generator; and iii) a hollow torch forming one of said nozzles and connected to the conduit for receiving the stoichiometric mixture from the conduit;

c) a plurality of burner assembly supports each supporting a corresponding one of the nozzles; and d) the holddown rollers each being operatively associated with one of said nozzles and each being biased when in use against a workpiece wound around the base roll.

15. The system of claim 8 wherein there are two flame seal mechanisms positioned to form such workpiece into two tubes.

16. The system of claim 15 wherein the flame seal mechanisms are identical, oppositely oriented and circumferentially interleaved.

17. The system of claim 8 wherein the supply includes a printing press and a folding mechanism, the press being for receiving the film in single ply form, printing the film and directing the film without interruption to the folding mechanism wherein the film is folded to provide the multi ply workpiece.

18. An inline system for producing interconnected plastic tubular commodities comprising:

a) a supply of plastic film;
b) a folding mechanism for receiving the plastic film and folding it into a multi-ply workpiece;
c) a flame seal mechanism operatively connected to the folding mechanism for conducting the workpiece along a path of travel and forming a bead seal to connect the workpiece into a tube, said flame seal mechanism comprising:

i) a heat conductive drum over which the plastic workpiece is fed in intimate contact along the path of travel;

ii) a plurality of flame seal nozzles positioned to impinge a plurality of hot, thin flames against an end portion of the workpiece; and iii) a plurality of heat conductive holddown rolls, each of said rolls associated with one of said nozzles for biasing the workpiece against the drum and cooperating with the drum to define the end portion of the workpiece operated on by the flames;

d) tube weakening means operatively connected to the seal mechanism for forming transverse lines of weakness to delineate the ends of interconnected commodities; and e) a take-up operatively connected to the weakening means for receiving the interconnected commodities.

19. The system of claim 18 wherein each such nozzle is at an acute angle with the path of travel.

20. The system of claim 18 wherein the seal mechanism further comprises a burner assembly for directing a flame onto such workpiece, said burner assembly including:

i) a fuel gas generator for generating a fuel gas mixture consisting essentially of a stoichiometric mixture of oxygen and hydrogen, ii) a plurality of conduits for receiving the fuel gas mixture from the fuel gas generator, and iii) a plurality of torches, each torch including a torch holder and a torch body supporting one of the plurality of nozzles for receiving the fuel gas mixture from one of the plurality of conduits for combustion adjacent said end portion of the workpiece.

21. The system of claim 18 including means for lifting the holddown rolls out of biased engagement with the workpiece when the system is not in use.

22. An inline system for producing interconnected plastic tubular commodities comprising:

a) a supply of plastic film;
b) a folding mechanism for receiving the plastic film and folding it into a multi-ply workpiece;
c) a flame seal mechanism operatively connected to the folding mechanism for conducting the workpiece along a path of travel and forming a bead seal to connect the workpiece into a tube, said flame seal mechanism comprising:

i) a heat conductive drum over which the plastic workpiece is fed in intimate contact along the path of travel;

ii) a plurality of nozzles positioned to impinge a plurality of jets of hot gas having a diameter no greater than 0.016 inch and a temperature no less than about 6,000° F. against an end portion of the workpiece; and iii) a plurality of heat conductive holddown rolls, each of said rolls associated with one of said nozzles for biasing the workpiece against the drum and cooperating with the drum to define the end portion of the workpiece operated on by the flames;

d) tube weakening means operatively connected to the seal mechanism for forming transverse lines of weakness to delineate the ends of interconnected commodities; and e) a take-up operatively connected to the weakening means for receiving the interconnected commodities.

23. The system of claim 22 wherein each such nozzle is at an angle no less than 15° and no greater than 20° with the path of travel.

24. The system of claim 22 wherein each jet of hot gas consists essentially of a burning stoichiometric mixture of hydrogen and oxygen.

25. The system of claim 22 including means for lifting the holddown rolls out of biased engagement with the workpiece when the system is not in use.

26. An inline system for producing interconnected plastic tubular commodities comprising:
 a) a supply of plastic film in the form of a multi-ply workpiece;
 b) two flame seal mechanisms operatively connected to the supply for conducting the workpiece along a path of travel and positioned in spaced relationship transversely of the path to form such workpiece into two tubes, said flame seal mechanisms comprising two drums separated by a gap over which the plastic workpiece is fed in intimate contact along the path of travel and each of said flame seal mechanisms further comprising:
 a heat conductive holddown mechanism cooperating with a section of one of said drums adjacent the gap to define an end portion of said workpiece; and
 a nozzle positioned to impinge a hot, thin flame against the end portion of the workpiece, the flame having an axis at an acute angle of at least 15° relative to a first imaginary plane, the first plane being tangential to the drum, the flame axis being angled toward the drum of the same flame seal mechanism to form one of said tubes, the flame axis also being disposed substantially in a second imaginary plane that is orthoganal to the first plane, extends radially of the drum and includes the axis of the drum; and,
 c) a take-up operatively connected to the seal mechanism for receiving the formed tubes.

27. The system of claim 26 wherein the flame seal mechanisms are identical, oppositely oriented and circumferentially interleaved.

28. The system of claim 26 wherein the supply includes a printing press and a folding mechanism, the press being for receiving the film in single ply form, printing the film and directing the film without interruption to the folding mechanism wherein the film is folded to provide the multi ply workpiece.

29. An inline system for producing interconnected plastic tubular commodities comprising:
 a) a supply of plastic film in the form of a multi-ply workpiece;
 b) a flame seal mechanism operatively connected to the folding mechanism for conducting the workpiece along a path of travel and forming a bead seal to connect the workpiece into a tube, said flame seal mechanism comprising:
 i) a heat conductive drum over which the plastic workpiece is fed in intimate contact along the path of travel;

ii) a plurality of nozzles positioned to impinge a plurality of jets of hot gas having a diameter no greater than 0.016 inch and a temperature no less than about 6,000° F. against an end portion of the workpiece; and
 iii) a plurality of heat conductive holddown rolls, each of said rolls associated with one of said nozzles for biasing the workpiece against the drum and cooperating with the drum to define the end portion of the workpiece operated on by the flames; and,
 c) a take-up operatively connected to the seal mechanism for receiving the workpiece.

30. The system of claim 29 wherein each such nozzle is at an angle no less than 15° and no greater than 20° with the path of travel.

31. The system of claim 29 wherein each jet of hot gas consists essentially of a burning stoichiometric mixture of hydrogen and oxygen.

32. The system of claim 29 including means for lifting the holddown rolls out of biased engagement with the workpiece when the system is not in use.

33. In a system for producing interconnected plastic tubular commodities, the improvement comprising:
 a) a supply mechanism for supplying multilayer plastic film;
 b) a flame seal mechanism operatively connected to the supply mechanism for conducting such film along a path of travel, melting projected edge portions of such film and forming a bead seal between layers of such film, said flame seal mechanism comprising:
 i) a heat conductive circular drum journaled for rotation about its axis and for defining one side of a major portion of a path of travel for such multiply film;
 ii) a heat conductive set of holddown rollers defining the other side of the major portion of the path and cooperating with the drum to form a workholder for causing transversely small portions of such film to project from the workholder; and
 iii) a set of nozzles located at spaced locations near said path, each such nozzle being positioned to emit a hot, thin flame when in use which flame impinges the projected edge portions of such film traveling along a minor portion of such path, the minor portion being adjacent the workholder and transversely aligned with the major portion; and,
 c) a take-up operatively connected to the seal mechanism for receiving sealed film.

34. The system of claim 33 wherein each nozzle is at an acute angle with the path of travel.

35. The system of claim 33 wherein the holddown rollers are circumferentially spaced about the drum and biased against such film when in use to maintain such film in engagement with the drum.

36. The system of claim 34 wherein the flame seal mechanism further comprises a burner assembly for directing a flame onto such film, said burner assembly including:
 i) a fuel gas generator for generating a fuel gas mixture consisting essentially of a stoichiometric mixture of hydrogen and oxygen, and
 ii) a plurality of torches supporting the nozzles for receiving the fuel gas mixture and conducting the mixture to the nozzles for combustion adjacent the longitudinal portions of the workpiece.

37. The system of claim 35 wherein each of said nozzles is paired with a holddown roller and positioned to impinge a hot, thin flame against a portion of such film projecting from the drum and hold down.

38. An inline system for producing interconnected plastic tubular commodities comprising:
   a) a supply of plastic film in the form of an elongate multi layer workpiece;
   b) a flame seal mechanism operatively connected to the supply for conducting the workpiece along a path of travel, melting projected edge portions of the workpiece and forming a seal to connect the workpiece layers, said flame seal mechanism comprising:
      i) a heat conductive circular drum journaled for rotation about its axis and for defining a major portion of a path of travel for the multi-ply workpiece; and,
      ii) a set of nozzles located at spaced locations near said path, each such nozzle being positioned to emit a hot, thin flame when in use which flame impinges the projected edge portions of the workpiece traveling along a minor portion of such path, the minor portion being adjacent the drum and transversely aligned with the major portion; and,
   c) each nozzle being canted toward the drum at an acute angle of at least 15° from an imaginary line perpendicular to the path of travel whereby to angularly impinge flames on such edge portions.

39. An inline system for producing interconnected plastic tubular commodities comprising:
   a) a supply of plastic film in the form of a multi-ply workpiece,
   b) two flame seal mechanisms operatively connected to the supply for conducting the workpiece along a path of travel and positioned to form such workpiece into two tubes, said flame seal mechanisms comprising two drums separated by a gap over which the plastic workpiece is fed in intimate contact along the path of travel and each of said flame seal mechanisms further comprising:

a set of heat conductive holddown rollers cooperating with a section of one of the associated drums of the same mechanism, the rollers being circumferentially spaced and biased when in use against such film adjacent the gap to define an end portion of said workpiece and maintain the workpiece in engagement with the associated drum; and a nozzle positioned to impinge a hot, thin flame against the end portion of the workpiece to form one of said tubes; and c) a take-up operatively connected to the seal mechanism for receiving the formed tubes.

40. The system of claim 39 wherein each of said nozzles is paired with a holddown roller and positioned to impinge a hot, thin flame against a portion of a workpiece projecting from the associated drum and holddown.

* * * * *